April 4, 1939.  R. P. A. BOCCHINO  2,152,948
DEVON MADE OF SOFT MATERIAL
Filed Sept. 1, 1936
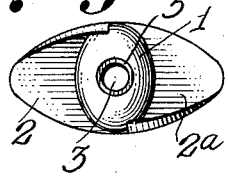
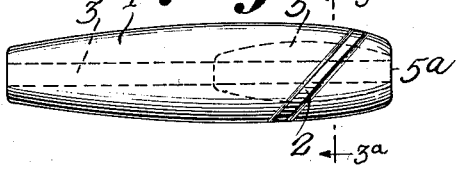
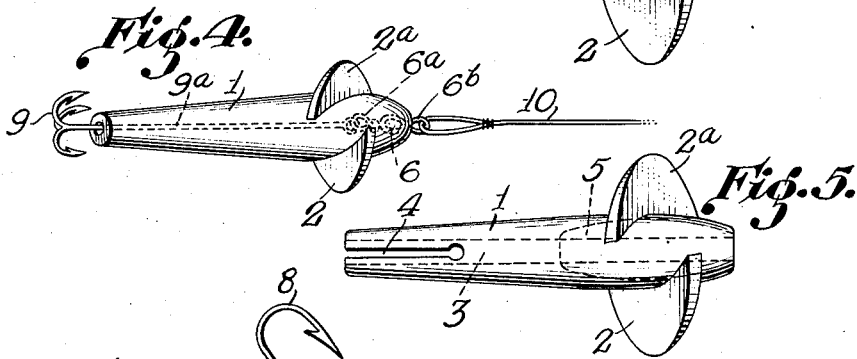
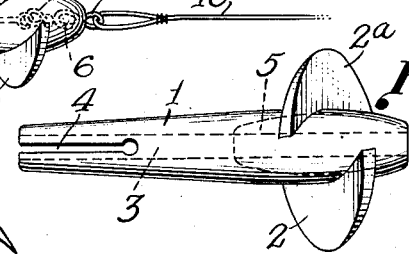
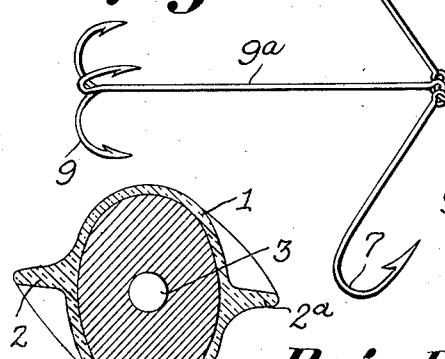
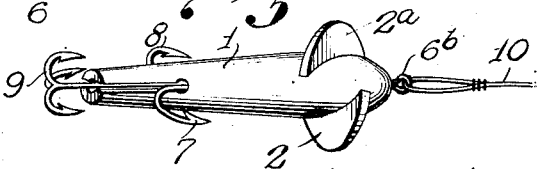
Inventor:
Roger Paul Alexandre Bocchino
by C A Snow & Co. Attorneys Patented Apr. 4, 1939

2,152,948

UNITED STATES PATENT OFFICE 2,152,948

DEVON MADE OF SOFT MATERIAL

Roger Paul Alexandre Bocchino, Paris, France

Application September 1, 1936, Serial No. 98,964
In France September 2, 1935

2 Claims. (Cl. 43—47)

My invention has for its object a devon made of soft material, which comprises a body with propellers entirely made of moulded solid india-rubber, such as latex, para and the like, axially perforated over its whole length so as to allow the bond connecting the back triple fish-hook to pass to the front swivel. Said devon is preferably provided at its rear part with two longitudinal slots allowing the passage of the stems of two simple fish-hooks connected to the same swivel.

According to another feature of my invention, the body with propellers made of solid india-rubber is moulded on an olive-shaped member made of a dense material, lead for example, disposed at its front part, so that the axis of its perforation will coincide with the axial perforation of the devon. The sizes and the weight of said olive-shaped member are so calculated as to secure the balancing and the weight of the devon.

Coloring can be obtained by incorporating essence of pearls into the mass of india-rubber before moulding.

Two embodiments of my invention are represented by way of example in the accompanying drawing in which:

Figs. 1 to 3 show the body of a devon made of soft material according to my invention, respectively, in plan view, seen from the side, and in end view.

Fig. 3ª is a cross section of the devon, on the line 3ª—3ª of Fig. 2.

Fig. 4 shows the devon in a mounted state, ready for use.

Fig. 5 is a perspective view of another embodiment of the body of a devon according to my invention.

Fig. 6 is a perspective view of the arming of said devon, and

Fig. 7 shows the devon ready for use.

The devon as shown in Figs. 1-4 comprises an elongated body 1, with propellers 2, 2ª, obtained by moulding a mass of solid india-rubber, such as latex, para and the like, upon an olive-shaped member 5, of a dense material, lead for instance, arranged at its front part. The sizes and the weight of said olive-shaped member are so calculated as to secure the balancing and the weight of the devon. An axial perforation 3, the axis of which coincides with the one 5ª of the olive-shaped member 5, is provided for in the mouding, for the purpose of allowing the arming to be introduced.

Said arming is constituted (Fig. 4) by a triple tail-end fish-hook 9 whose stem 9ª is articulated to the rear ring 6ª of a swivel 6 projecting at its front part so as to allow the same to be connected through its front ring 6ᵇ to the end of a line 10.

Coloring of the devon body can be obtained by any suitable processes, as known or not; my invention particularly provides for the incorporation of essence of pearls into the mass of india-rubber before moulding.

According to the embodiment shown in Figs. 5-7, two symmetrical longitudinal slots, such as 4, are provided for in the moulding.

The arming is constituted by two simple lateral fish-hooks 7 and 8 (Fig. 6), and the usual triple tail-end fish-hook 9 whose stems, of a sufficient length, are articulated to the ring 6ª of a swivel 6.

The invention further provides for the use of current fish-hooks whose stems, of medium lengths, are connected to the ring 6ª of the swivel through sufficiently rigid binding means, such as pianoforte strings, for instance.

For mounting said devon, one proceeds as with an ordinary devon, the stem of the triple fish-hook, or its bond, passing through the axial perforation of the body of the devon, whilst the stems or bonds of the hooks 7 and 8 are engaged in the longitudinal slots 4, as shown in Fig. 7; the swivel 6 projects at its front part, so as to allow the same to be connected through its ring 6ᵇ to the end of a line 10.

It will be noticed at once that the flexibility of the body of the devon according to my invention, and especially of its propellers which flatten under the attack of the fish, will allow the latter to have a far better catch, contrarily to what happens with other devons. The arrangement which is adopted for the arming will allow the body of the devon to be, at every capture, easily thrown-off, as the reactions exerted by the same upon the end of the line during the defense of the fish, are much less rough than with a rigid body. Finally, the flexibility of the devon has the advantage of avoiding the breakages or distortions of the body and of the propellers which usually take place when shocks against hard bodies occur and reduces the number of jammings capable of causing the loss of the devon.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. A devon bait which comprises, in combination, a body made of a flexible material provided with an axial hole extending therethrough, a heavy core in said body limited to the front part thereof, provided with a hole coaxial with said first mentioned hole, at least two propellers also made of a flexible material, on the front part of said body, and an arming including a tail end hook the stem of which extends through both of said holes, and a swivel in the front part of the last mentioned hole projecting at the front from said hole and the rear end of which is connected with the front part of said stem.

2. A devon bait which comprises, in combination, a body made of a flexible material provided with an axial hole extending therethrough, a heavy core in said body limited to the front part thereof, provided with a hole coaxial with said first mentioned hole, at least two propellers also made of a flexible material, on the front part of said body, said body being provided, in its rear part, with two lateral longitudinal slots opening into said axial hole, and an arming including a swivel located in the front part of the second mentioned hole, two lateral hooks passing through said lateral slots and having respective stems directly connected to the rear part of said swivel, and a triple tail end fish-hook the stem of which extends through both of said holes and is connected at the front to the rear part of said swivel.

ROGER PAUL ALEXANDRE BOCCHINO.